(12) United States Patent
Gädecke et al.

(10) Patent No.: US 11,898,594 B2
(45) Date of Patent: Feb. 13, 2024

(54) FASTENING APPARATUS

(71) Applicant: ILLINOIS TOOL WORKS INC., Glenview, IL (US)

(72) Inventors: Jacqueline Gädecke, Parsau (DE); Javier Arteta, Puente la Reina Gares (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/852,909

(22) Filed: Jun. 29, 2022

(65) Prior Publication Data
US 2023/0003240 A1   Jan. 5, 2023

(30) Foreign Application Priority Data

Jul. 1, 2021   (DE) .................... 10 2021 116 970.4
Jun. 24, 2022  (DE) .................... 10 2022 115 735.0

(51) Int. Cl.
*F16B 5/06*     (2006.01)
*B60N 3/04*     (2006.01)

(52) U.S. Cl.
CPC ............. *F16B 5/065* (2013.01); *B60N 3/046* (2013.01)

(58) Field of Classification Search
CPC ................................ F16B 5/065; B60N 3/046
See application file for complete search history.

(56) References Cited

U.S. PATENT DOCUMENTS

| | | | | |
|---|---|---|---|---|
| 4,122,583 A * | 10/1978 | Grittner | .............. | F16B 19/1081 411/509 |
| 4,312,614 A * | 1/1982 | Palmer | ................ | F16B 19/1081 24/297 |
| 4,920,618 A * | 5/1990 | Iguchi | ................... | F16B 13/061 24/297 |
| 5,028,187 A * | 7/1991 | Sato | .................... | F16B 19/1081 411/48 |
| 5,775,859 A * | 7/1998 | Anscher | ................. | F16B 5/065 411/509 |
| 6,659,701 B1 * | 12/2003 | Risdale | ................... | F16B 5/065 411/510 |

(Continued)

FOREIGN PATENT DOCUMENTS

WO   WO-2021045939 A1 * 3/2021 ............. F16B 5/065

*Primary Examiner* — Jason W San
(74) *Attorney, Agent, or Firm* — THOMPSON HINE LLP

(57) ABSTRACT

A fastening apparatus includes an annular base element having an assembly wall for abutting a first component and a first fastening wall for abutting the second component, and an assembly element having a bottom wall. To enable passage through a second through-opening of the second component, the assembly element has a smaller diameter than the base element. At least two diametrically opposed foldable retaining arms are arranged radially circumferentially and connect the assembly wall to the assembly element. The retaining arms are each connected to the assembly element and the base element via a respective joint and form an articulated joint in the region between the joints. A region of the retaining arms between the articulated joints and the assembly wall forms a fastening portion, and at least one catching device is provided to connect the base element to the assembly element in an assembly position.

10 Claims, 8 Drawing Sheets

(56) References Cited

U.S. PATENT DOCUMENTS

| | | | | |
|---|---|---|---|---|
| 8,936,420 | B2* | 1/2015 | Scroggie | B23P 19/08 |
| | | | | 411/45 |
| 10,624,443 | B2* | 4/2020 | Haber | A45F 5/10 |
| 10,638,627 | B1* | 4/2020 | Stime | F16M 11/10 |
| 10,774,864 | B2* | 9/2020 | Shinoda | B60R 13/0206 |
| 2005/0241118 | A1* | 11/2005 | Mizukoshi | F16B 5/065 |
| | | | | 24/297 |
| 2013/0287518 | A1* | 10/2013 | Scroggie | B23P 19/08 |
| | | | | 411/80 |
| 2016/0069512 | A1* | 3/2016 | Grieve | A45F 5/00 |
| | | | | 294/142 |
| 2017/0195000 | A1* | 7/2017 | Srour | H04R 1/1033 |
| 2020/0291985 | A1* | 9/2020 | Srour | F16C 11/12 |
| 2022/0042613 | A1* | 2/2022 | Arteta Unanua | F16K 31/001 |
| 2023/0003240 | A1* | 1/2023 | Gädecke | B60N 3/046 |

* cited by examiner

FASTENING APPARATUS

TECHNICAL FIELD

The present invention relates to a fastening device, as well as to a fastening system having such a fastening apparatus, for fastening a first component to a second component, in particular for fastening a floor mat to a vehicle floor or rug.

BACKGROUND

Floor mat fastening apparatuses are typically configured as two-part or multi-part systems.

WO 2021/045939 discloses a fastening apparatus as well as a fastening system having such a fastening apparatus.

The problem of the present invention is to provide a fastening apparatus as well as a fastening system for fastening a first component to a second component, in particular for fastening a floor mat to a vehicle floor, which provide an alternative to known fastening apparatuses.

In particular, it is a problem of the present invention to provide a fastening apparatus as well as a fastening system that are simple in structure as well as safe and reliable in operation.

SUMMARY

According to the invention, a fastening apparatus is provided for fastening a first component to a second component, in particular for fastening a floor mat to a vehicle floor. It comprises an annular base element having an assembly wall for abutting against a first component and a first fastening wall opposite the assembly wall for abutting against a second component, an assembly element having a bottom wall, wherein, in order to be passed through a second through-opening of a second component in an assembly direction, the assembly element has a smaller diameter than the base element, and two diametrically opposed, foldable retaining arms, which connect the assembly wall of the base element to the assembly element, wherein the retaining arms are each connected to the assembly element and the base element via a respective joint or hinge and form an articulated joint in the region between the joints, wherein a region of the retaining arms between the articulated joints and the assembly wall forms a fastening portion, and wherein at least one catching device is provided in order to connect the base element to the assembly element in an assembly position, such that a second component is retained between the fastening wall and the fastening portions, such that the fastening apparatus is connected to the second component, and an assembly body for connecting to a first component, which extends counter to an assembly direction, wherein means are provided on the assembly body for connecting to a correspondingly configured means of a first component.

With the fastening apparatus of the invention, a floor mat fastening that is fastenable to a vehicle floor, in particular a rug and or a corresponding carrier component of a motor vehicle, is provided in order to then connect a floor mat to the vehicle floor via the fastening apparatus.

The fastening apparatus according to the invention is integrally configured and can be easily connected to a vehicle floor, as will be described in further detail below.

The fastening apparatus can also be made from a plastic, preferably by means of a single-component injection molding process.

In the context of the present invention, an assembly direction or axial direction is understood to mean a direction that extends in the direction of a second component and that is arranged substantially orthogonally to a component surface of the second component.

The assembly body can be arranged on the bottom wall of the assembly element and can extend towards the base element, wherein the base element comprises a through-opening for passage of the assembly body.

Thus, when transitioning from a home position into a final assembly position, the assembly body shifts in the axial direction in the direction of the base element or counter to the assembly direction such that, in the final assembly position, it extends from the assembly wall of the base element counter to the assembly direction.

According to an alternative design, the assembly body can be integrally formed on the assembly wall of the base element.

Thus, the assembly body always extends, i.e., also in the final assembly position, from the assembly wall of the base element counter to the assembly direction.

Three or four or five or more foldable retaining arms can be provided, which are preferably arranged radially circumferentially and equally spaced apart from one another.

In the region of the articulated joint, a region of the retaining arms between the articulated joint and the assembly element can be extended in the radial direction beyond the articulated joint, wherein said extension forms a securing portion, and wherein the securing portion forms a preferably approximately rectangular securing face, which is arranged in an assembly position approximately parallel to a surface of a second component.

Preferably, an edge of the securing face facing in the direction of the articulated joint can form a securing edge.

In a final assembly position, it is provided that the securing portion abuts against an underside of a vehicle floor or a rug or a carrier component of a motor vehicle. In this way, the frictional forces between the fastening apparatus and the vehicle floor are increased so as to prevent the fastening apparatus from slipping in addition to the retaining forces of the retaining arms.

The securing edge reinforces this effect once more, as a sharp edge of the securing face slightly penetrates into a vehicle floor, which also prevents the fastening apparatus from slipping.

The assembly body can comprise means, in particular an edge or a catching edge, for connecting to a correspondingly configured means of a first component.

For example, the assembly body can be approximately conical in shape, wherein the assembly body is configured to flare conically, in particular in an assembly direction. An edge of the assembly body that is radially circumferential in the assembly direction can form a catching edge, so that a first component with a corresponding fastening device can be connected to a vehicle floor via the fastening apparatus. The first component can be, for example, a floor mat or an interior rug of a motor vehicle.

In the fastening apparatus according to the invention, the components can be arranged in the assembly direction as follows: first the base element, then the retaining arms, and the assembly element in front in the assembly direction.

The catching device can have catching arms that extend approximately in the assembly direction and are integrally formed on the fastening wall of the base element, wherein correspondingly configured counter-catching means, in particular catching recesses, are arranged on the assembly element. The fastening apparatus can be safely and reliably fixed in a final assembly position via the catching arms.

The catching arms can be arranged in the region between the retaining arms and the through-opening. In this case, at least two diametrically-opposed catching arms or three or four or five catching arms, arranged radially circumferentially and equally spaced apart from one another, can be provided.

Preferably, only two retaining arms can be provided. Such a configuration is advantageous in that a deformation process is simplified in the manufacture of the fastening apparatus by means of an injection molding method and can thereby be carried out more cost-effectively.

In such a configuration of the fastening apparatus with two retaining arms, the catching arms can be arranged offset by 90° from the retaining arms in a top and bottom plan view. Such an arrangement also simplifies the deformation process in the manufacture of the fastening apparatus by means of an injection molding process.

Furthermore, a stop edge or a stop face can be formed on the fastening element, against which the fastening wall can abut with a counter-stop edge or a counter-stop face in the final assembly position when the fastening apparatus is subjected to a force or a tensile force acting counter to the assembly direction or also a compressive force acting in the assembly direction or a tilting torque, in order to receive the forces in question.

By providing a corresponding stop edge, the retaining forces of the fastening apparatus according to the invention are significantly increased, because the assembly element then abuts against the base element in the case of a tensile force acting counter to the assembly direction and cannot be pulled through the corresponding through-opening, which would also lead to a slight deformation of the fastening apparatus. In addition, the retaining arms are protected against damage, as the forces occurring during loading can be dissipated via the retaining arms in the axial or assembly direction.

This means that when the base element abuts against the counter-stop edge or face of the assembly element with the stop edge or face of the fastening wall in the final assembly position and is loaded in tension, e.g., by unbuttoning a floor mat, so that a tensile load acts on the assembly body, the force is dissipated or transferred via the stop edge and the counter-stop edge and not directly to the joints, in particular the film hinges. In this way, multiple loads can be applied via the assembly body in the pulling direction.

The assembly element can comprise a base body that is approximately rectangular. The retaining arms can be connected to the bottom wall of the base body as well as to the fastening wall in an articulated manner, preferably via hinges, in particular film hinges.

Furthermore, the retaining arms can have approximately central articulated joints, which are preferably also configured as film hinges.

A region of the retaining arms between the articulated joints and the fastening wall can form a respective fastening portion for retaining a vehicle rug.

A region of the retaining arms between the articulated joints and the bottom wall can respectively form an arm portion.

In the region of the retaining arms, abutting portions can be integrally formed on the base body or on the bottom wall of the base body. These can preferably extend in the horizontal direction or radially outward.

In addition, abutting ribs can be integrally formed on the faces of the arm portions facing the direction of the fastening portions.

The abutting portions and/or the abutting ribs are provided in order to abut the retaining arms in the final assembly position and to receive forces acting on the fastening apparatus (tensile and compressive forces and tilting torque acting on the fastening apparatus) and preferably to dissipate them in the axial direction via the retaining arms. In operation, such forces can be induced by a floor mat connected to a fastening apparatus according to the invention and coupled to the fastening apparatus.

Accordingly, the abutting portions and/or the abutting ribs act analogously to the stop edge and the counter-stop edge.

Furthermore, according to the present invention, a method for connecting a fastening apparatus described above to a second component, in particular to a vehicle floor or a rug of a motor vehicle, is provided. This method comprises the following steps: inserting an assembly element into a through-opening of a second component in an assembly direction until a first fastening wall of the base element abuts against a surface of the component, wherein, upon insertion in the assembly direction, the second component is clamped by retaining arms in a region between the fastening wall and the fastening portions, and connecting the assembly element to the base element by means of a catching device.

It is thus provided that the fastening apparatus is inserted from above or in the assembly direction through an opening into a vehicle floor or a rug of a vehicle. By subjecting the fastening apparatus to a linear compressive force acting in the assembly direction, the assembly element opposite the base element is spread along a cover (carrier component) located behind the vehicle floor or rug. The flaring or folding of the retaining arms results in a lower or rear component abutment.

Upon insertion into an opening of a vehicle floor or rug or a trim part located behind it, the foldable retaining arms move along the through-opening in a second component and follow the geometry of the corresponding through-opening. The base element and the assembly element are connected to one another via the catching means.

The number of retaining arms depends on the retaining forces required. As more retaining arms are provided, accordingly higher retaining forces can be achieved with the fastening apparatus according to the invention.

In a final assembly position in which the fastening apparatus is fixedly connected to a second component, the retaining arms lie with their fastening portions in the assembly direction behind the second component.

According to a further aspect of the present invention, a fastening apparatus is provided for fastening a first component to a second component, in particular for fastening a floor mat to a vehicle floor. It comprises a fastening apparatus described above and a fastening device having a second component, comprising a circular disk-shaped cover wall with a visual side and an assembly side, wherein connecting means configured correspondingly to the assembly body of the fastening device are provided in the region of a through-opening.

In this way, a simple fastening system is provided, which comprises only two components, namely the fastening apparatus and the fastening device, each formed from a single piece.

The fastening device can comprise two diametrically-opposed, foldable second retaining arms, wherein second fastening portions of the second retaining arms extend radially outward and are connected to the assembly side via a respective joint, wherein the second fastening portions are connected to catching portions and second catching devices via an articulated joint in order to connect the retaining arms to the assembly side in an assembly position, such that a first component is retained between the fastening portions and the assembly side, such that the fastening device is connected to the first component.

The fastening apparatus can also comprise three or four or five or more foldable second retaining arms, which are arranged radially circumferentially and preferably equally spaced apart from one another.

In addition, according to a further aspect of the present invention, a method for fastening a first component to a second component, in particular for fastening a floor mat to a vehicle floor having a protruding fastening system, is provided. It includes the following steps: A method discussed above for connecting the fastening apparatus to a second element, and inserting a fastening means into a second through-opening of a first component in an assembly direction until a first assembly side of a cover wall abuts against a surface of the first component, wherein, upon insertion in an assembly direction, the first component is clamped by retaining arms in a region between the assembly side and the second assembly portions, and connecting the fastening device to an assembly element of the fastening apparatus via connecting means.

With corresponding fastening apparatuses and fastening devices, as well as the method briefly summarized above for fastening a first component to a second component, floor mats can be easily, safely, and reliably connected to a vehicle floor, in particular a vehicle rug and/or a structure of a motor vehicle located behind it.

BRIEF DESCRIPTION OF THE DRAWINGS

The present invention will be described in further detail below on the basis of the exemplary embodiments shown in the figures. The figures show.

DETAILED DESCRIPTION

Figure 1:
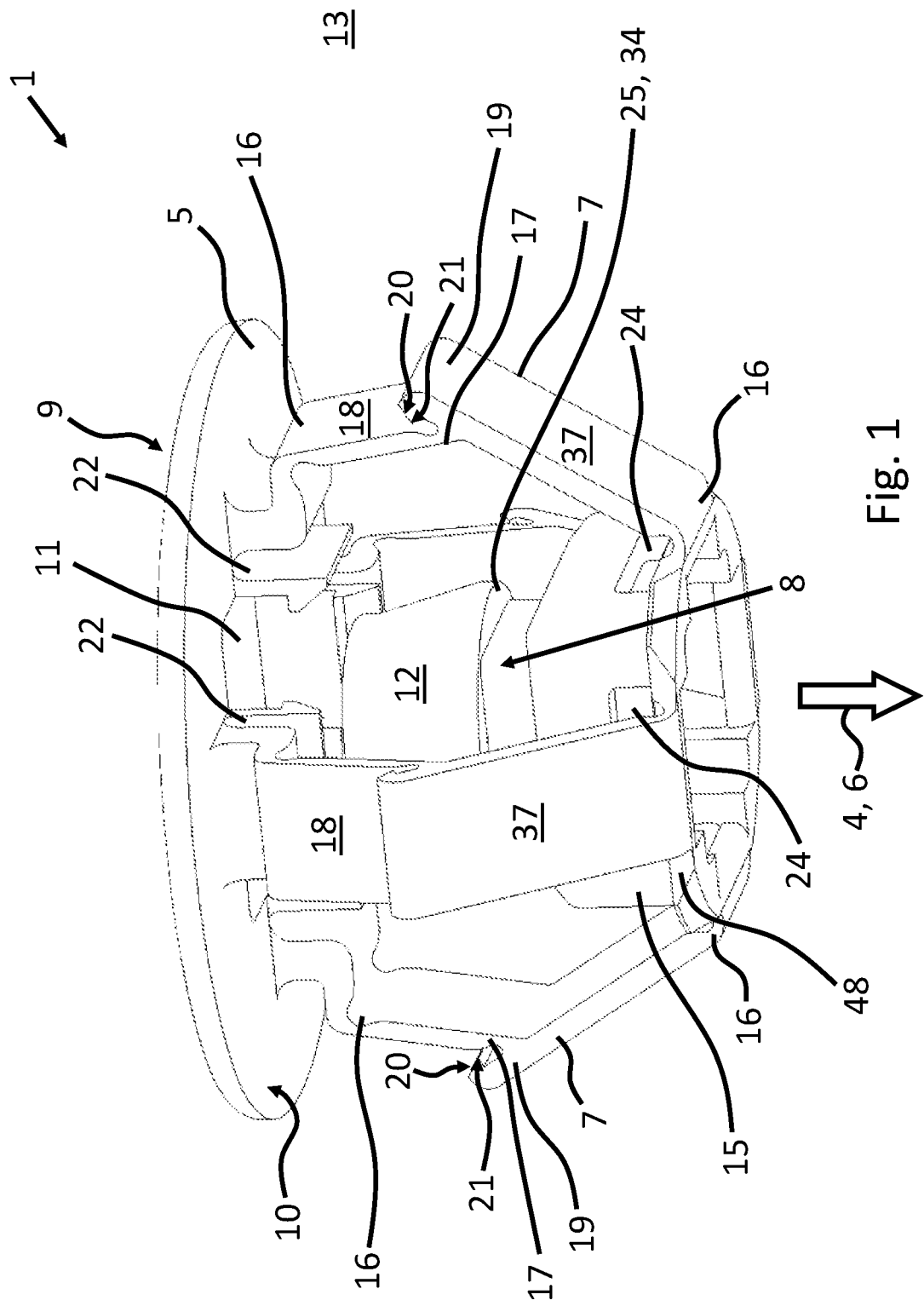
FIG. 1 a perspective view of a fastening apparatus according to the invention, FIG. 2 a side-cut view of the fastening apparatus in a home position, FIG. 3 a further side-cut view of the fastening apparatus in a final assembly position, FIG. 4 a further exemplary embodiment of the fastening apparatus in a side-cut view in a home position, FIG. 5 a schematic, side-cut view of the fastening apparatus upon insertion into a through-opening of a second component, FIG. 6 a schematic, side-cut view of the fastening apparatus upon connection to a second component in an intermediate position, FIG. 7 a further schematic, side-cut view of the fastening apparatus in a final assembly position, FIG. 8 a perspective view of a fastening apparatus according to the invention, FIG. 9 a schematic, side-cut view of the fastening apparatus in a pre-assembly position, FIG. 10 a schematic, side-cut view of the fastening apparatus in a final assembly position, FIG. 11 a schematic, side-cut view of the fastening apparatus and the fastening device in a state of being connected to one another in a final assembly position, FIG. 12 a perspective view of a fastening apparatus according to the invention according to a second exemplary embodiment, and FIG. 13 a side-cut view of the fastening apparatus from FIG. 12 in a home position, and FIG. 14 a side-cut view of the fastening apparatus from FIG. 12 in a final assembly position.
Figure 2:
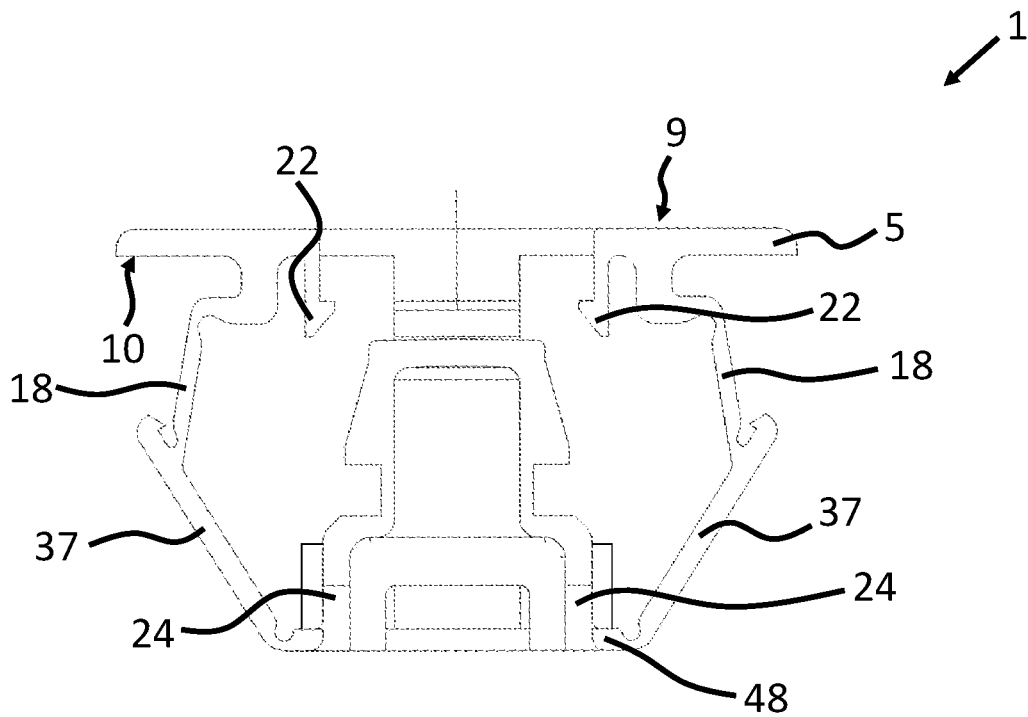
Figure 3:
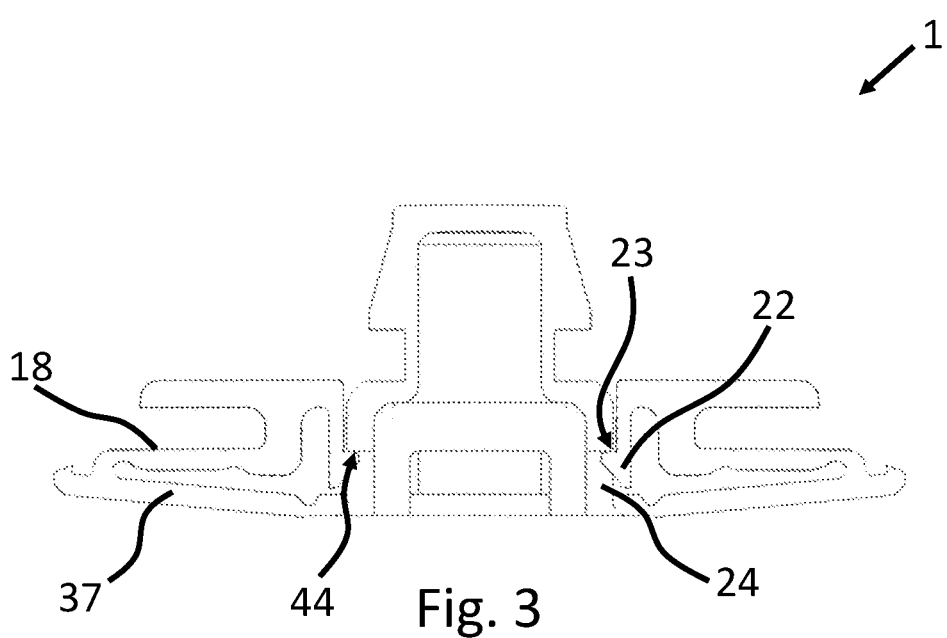

In the following, a fastening apparatus 1, a fastening device 2, and a fastening system 3 for fastening a first component 52 to a second component 53, in particular for fastening a floor mat 52 to a vehicle floor 53, are described in further detail (FIGS. 1 to 11).

The fastening apparatus 1 according to the invention can be inserted into a through-opening of a second component in an assembly direction 4 and connected thereto (FIGS. 1 to 7). In the context of the present invention, the assembly direction 4 or an axial direction 6 is understood to mean a direction in which the fastening apparatus 1 can be inserted into the through-opening of the second component 53, wherein this direction is arranged approximately orthogonally to a component surface of the second component 53 surrounding the through-opening.

The fastening apparatus 1 comprises an annular disk-shaped base element 5, which is connected to an assembly element 8 via retaining arms 7 extending in the axial direction 6.

The base element 5 comprises an assembly wall 9 for abutting against a first component 52 and an assembly wall 10 facing in the assembly direction 4 for abutting against the second component 53.

In the base element 5, a through-opening 11, which is preferably formed rectangularly in cross-section, is configured for the passage of an assembly body 12. Alternatively, the through-opening 11 can also have a rectangular or a circular or polygonal cross-section.

The four first retaining arms 7 are integrally formed on the fastening wall 10 and are arranged radially circumferentially and equally spaced from one another. The first retaining arms 7 extend in a home position or pre-assembly position 13 in approximately the assembly direction 4 or in the axial direction 6. In a final assembly position 14, the retaining arms 7 extend approximately radially outward.

Alternatively, the fastening apparatus 1 can also comprise two or three or five or more first retaining arms 7.

The assembly element 8 comprises a base body 15, which is approximately rectangular. The retaining arms 7 are articulated with the base body 15 as well as with the fastening wall 10, preferably via joints or hinges 16, in particular film hinges.

Furthermore, the retaining arms 7 have approximately central articulated joints 17, which are preferably also embodied as film hinges.

A region of the retaining arms 7 between the articulated joints 17 and the assembly wall 10 forms a respective fastening portion 18.

A region of the retaining arms 7 between the articulated joints 17 and the base body 15 forms a respective arm portion 37.

In the region of the articulated joint 17, a region of the retaining arms between the articulated joint 17 and the assembly element 8 is extended radially outward beyond the articulated joint 17. This extension forms a securing portion 19, which provides a securing face 20 that is approximately rectangular.

In the final assembly position 14, the securing face 20 is arranged approximately parallel to a surface of a second component 53. An edge of the securing face 20 facing the articulated joint forms a securing edge 21.

Catching elements 22 of a catching device 23 are formed radially circumferentially about the through-opening 11 on the fastening wall 10, extending in the assembly direction 4 and axial direction 6.

In the base body 15, catching recesses 24 of the catching device 23 are formed corresponding to the catching elements 22. The base element 5 can be connected to the assembly element 8 in the final assembly position 14 via the corresponding catching elements 22 of the base element 5 and the catching recesses 24 of the assembly element 8 or via the catching device 23 in such a way that a second component 53 can be retained between the fastening wall 10 and the fastening portions 18, so that the fastening apparatus 1 is connected to the second component 53.

An assembly body 12 extending counter to the assembly direction 4 is integrally formed on the base body 15. The assembly body 12 is configured to flare approximately conically in the assembly direction, wherein a radially circumferential edge 25 of the assembly body facing in the assembly direction is provided for catching with the fastening device 2 or with a first component 52, in particular a fastening device 2.

In the final assembly position 14, the assembly body 12 is arranged entirely in the region of the assembly wall 9 counter to the assembly direction by extending through the through-opening 11 such that the base body 15 is arranged in the through-opening 11. In this arrangement, a type of anti-rotation feature is also formed by the rectangular cross-portion of the through-opening 11 and the base body 15.

According to one embodiment (FIG. 4), a stop edge 26, which faces in the assembly direction 4 and limits the through-opening 11, is also provided on the base element 5. The stop edge 26 or face is preferably formed by a face facing in the assembly direction 4 of the base element 5 or the fastening wall 10.

Furthermore, a radially circumferential counter-stop edge 27 is provided on the cuboid base body 15 of the assembly element 8 in order to limit a movement of the assembly element 8 counter to the assembly direction 4 with respect to the base element 5. The counter-stop edge 27 or face is preferably formed by a face of the cuboid base body facing counter to the assembly direction 4.

This means that when the base element abuts against the counter-stop edge or face of the assembly element with the stop edge or face of the fastening wall in the final assembly position and is loaded in tension, e.g., by unbuttoning a floor mat, so that a tensile load acts on the assembly body, the force is dissipated or transferred via the stop edge and the counter-stop edge and not directly to the joints, in particular the film hinges. In this way, multiple loads can be applied via the assembly body in the pulling direction.

Figure 4:
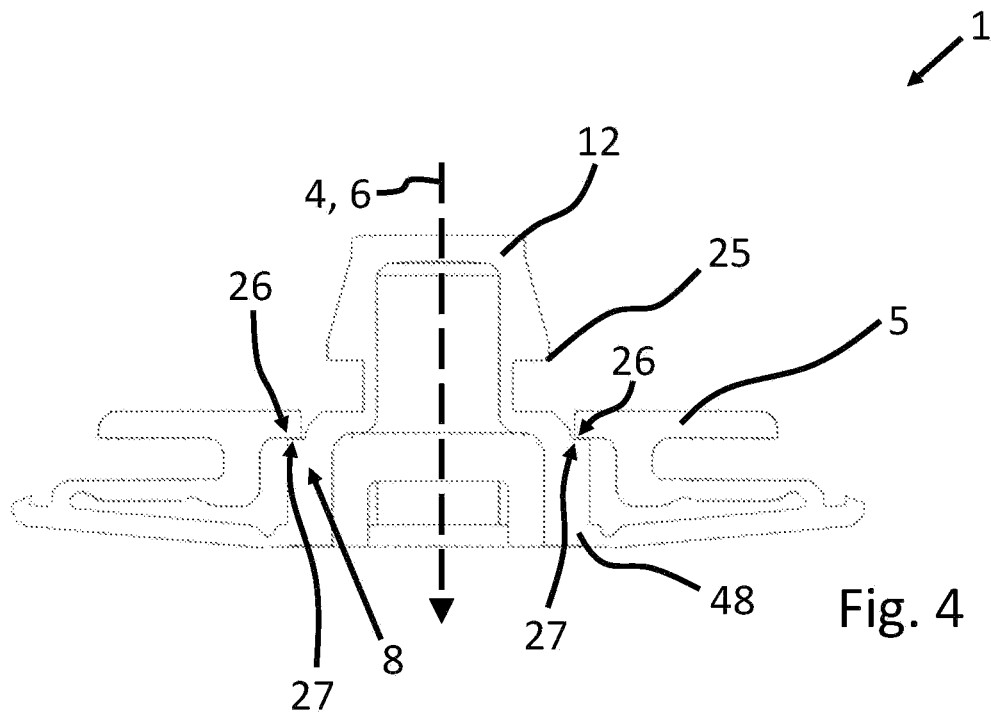
Figure 5:
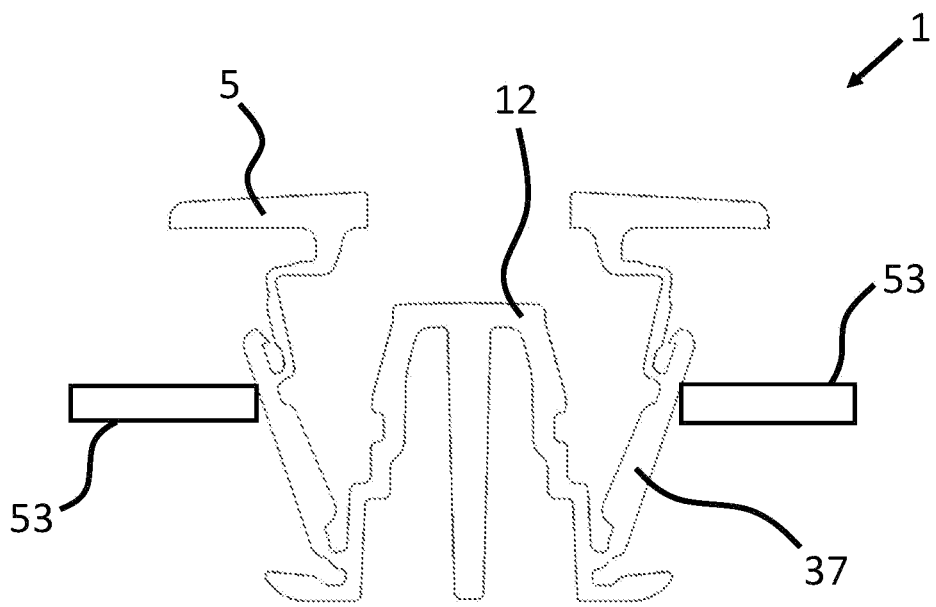
Figure 6:
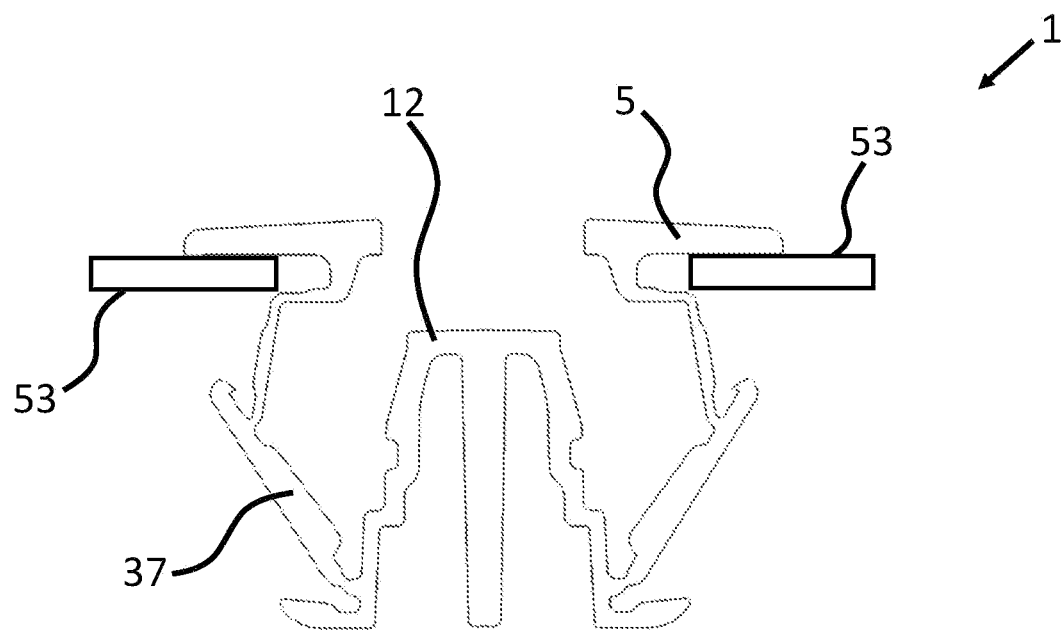
Figure 7:
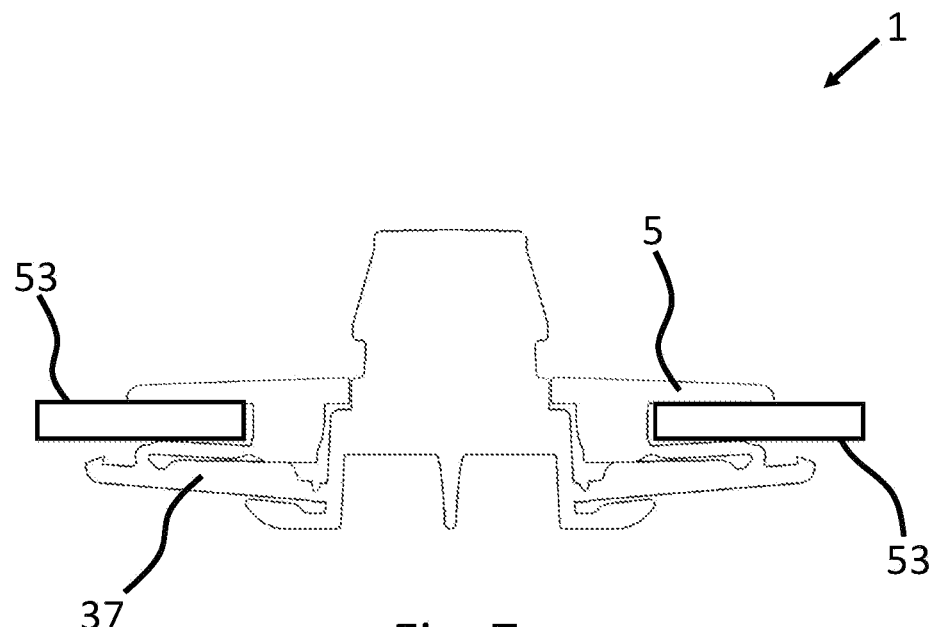
Figure 12:
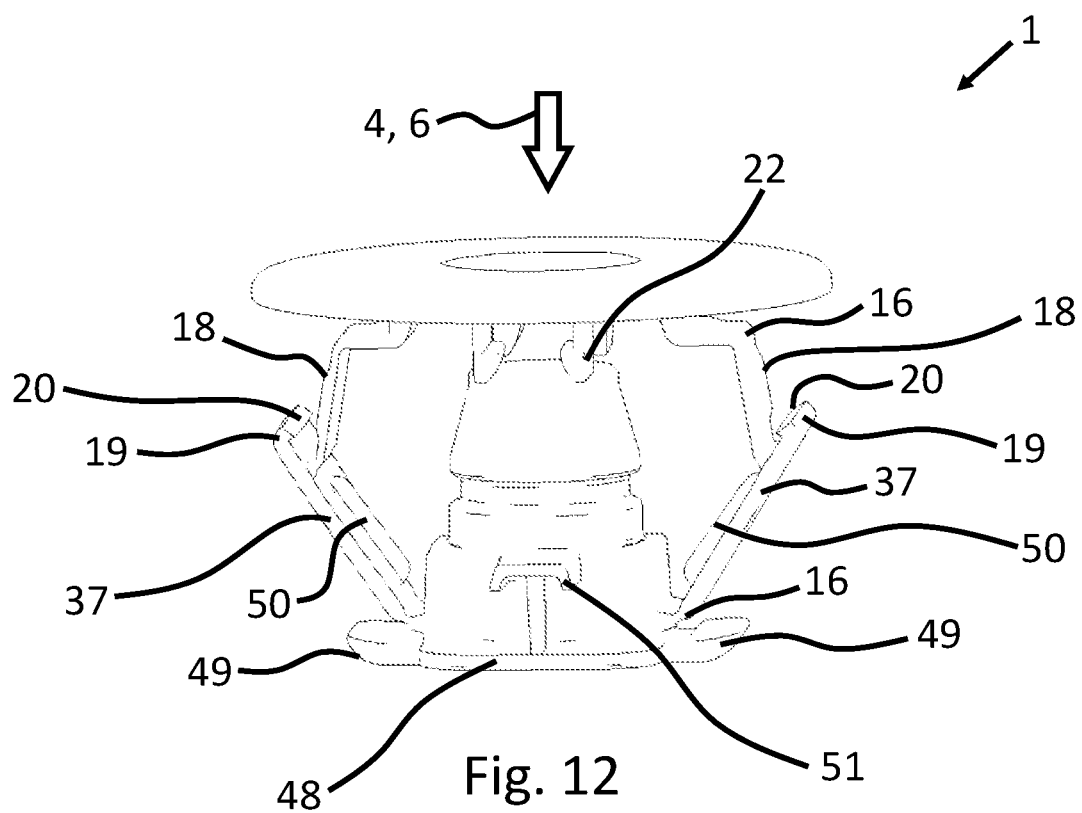
Figure 13:
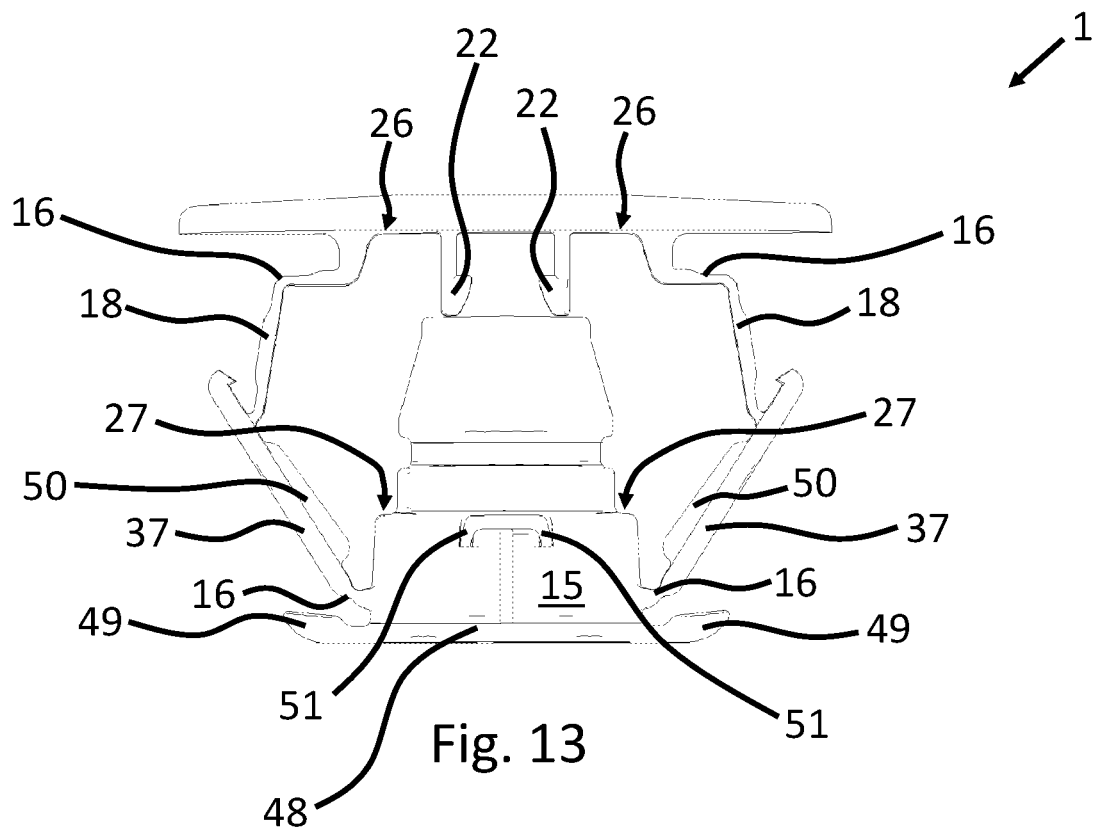
Figure 14:
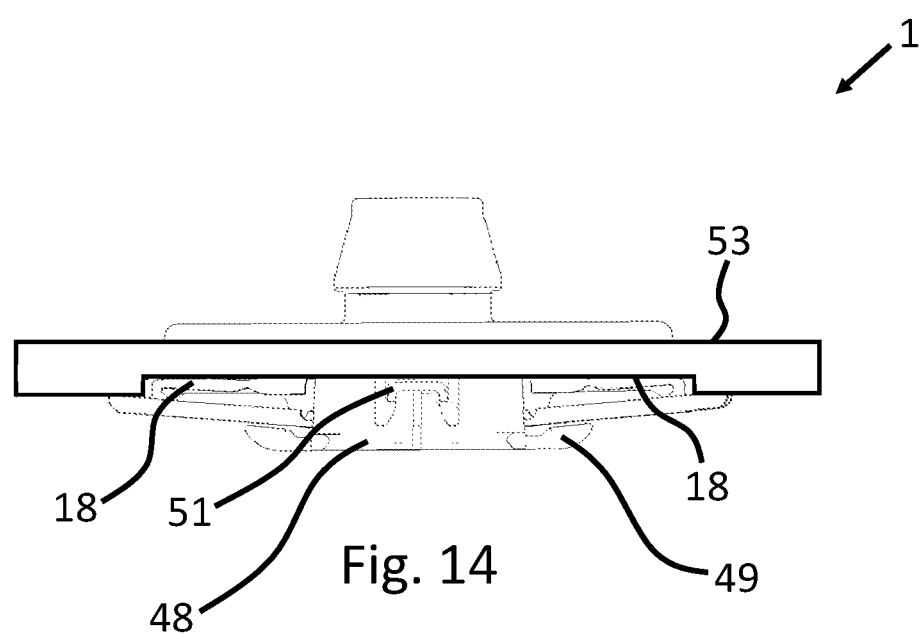

A fastening apparatus 1 according to the present invention according to a second exemplary embodiment comprises, unless otherwise described, all of the technical features of the fastening apparatus 1 according to the first exemplary embodiment and also the stop edge 26 from FIG. 4 (FIGS. 12 to 14).

According to this fastening apparatus 1, only two diametrically opposed retaining arms are provided.

Unlike in the first exemplary embodiment, the catching elements 22 of the catching device 23 are not arranged in the region of the retaining arms 7; rather, the catching arms 22 are arranged in pairs offset by 90° from the retaining arms in a top plan view.

On a bottom wall 48 of the base body 15, counter-catching elements 51 are formed in place of the catching recesses 24.

The retaining arms 7 have approximately central articulated joints 17, which are preferably embodied as film hinges.

A region of the retaining arms 7 between the articulated joints 17 and the assembly wall 10 forms the respective fastening portion 18.

A region of the retaining arms 7 between the articulated joints 17 and the base body 15 forms a respective arm portion 37.

In the region of the retaining arms 7, plate-like abutting portions 49 are formed on the base body 15 and/or on the bottom wall 48 of the base body 15. These extend in the horizontal direction or radially outward.

In addition, abutting ribs 50 are integrally formed on the faces of the arm portions 37 facing in the direction of the fastening portions 18.

The abutting portions and/or the abutting ribs act analogously to the stop edge and the counter-stop edge.

The technical features of the fastening device can be combined individually or in their entirety with the fastening apparatus 1 according to the first exemplary embodiment.

Figure 8:
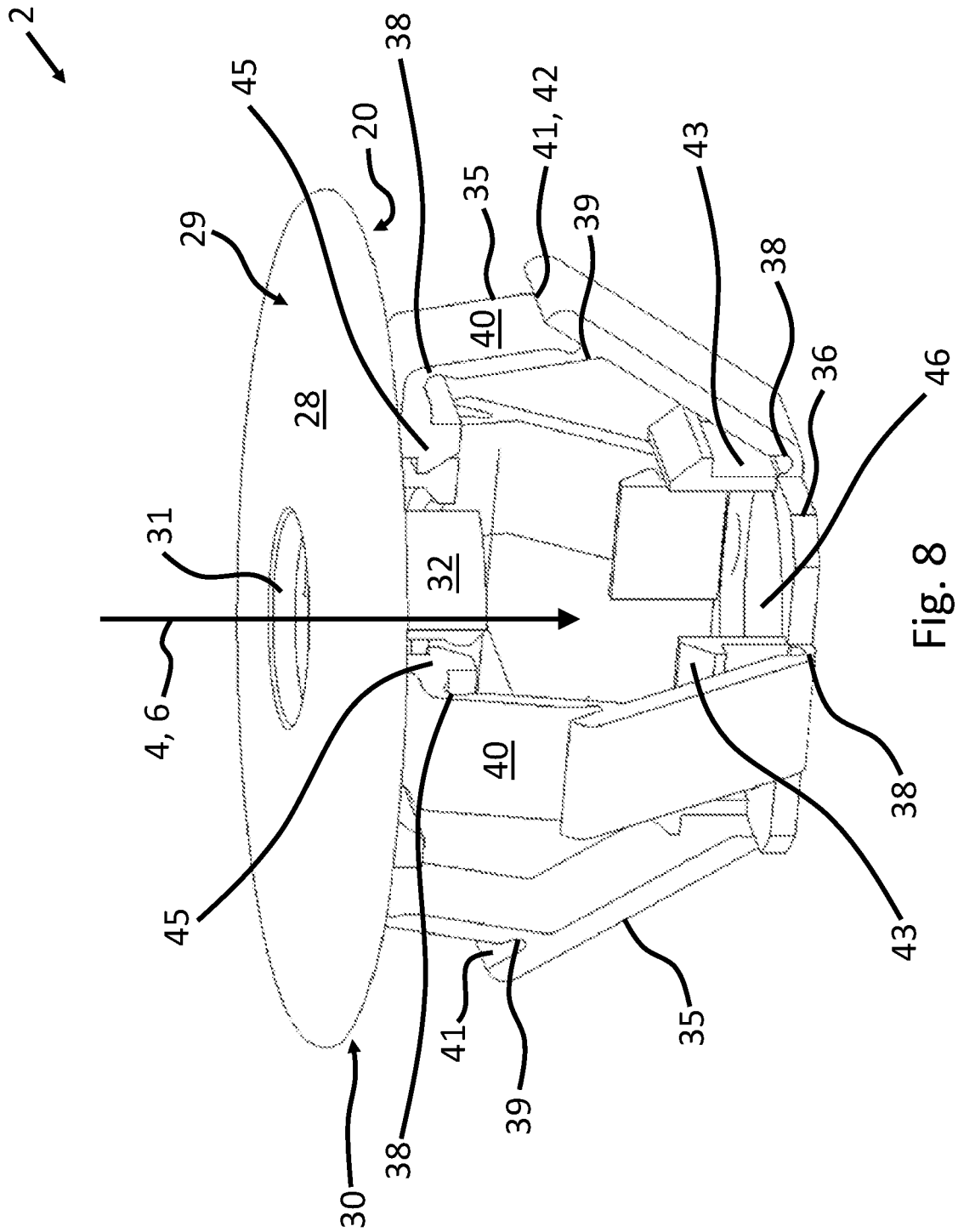
Figure 9:
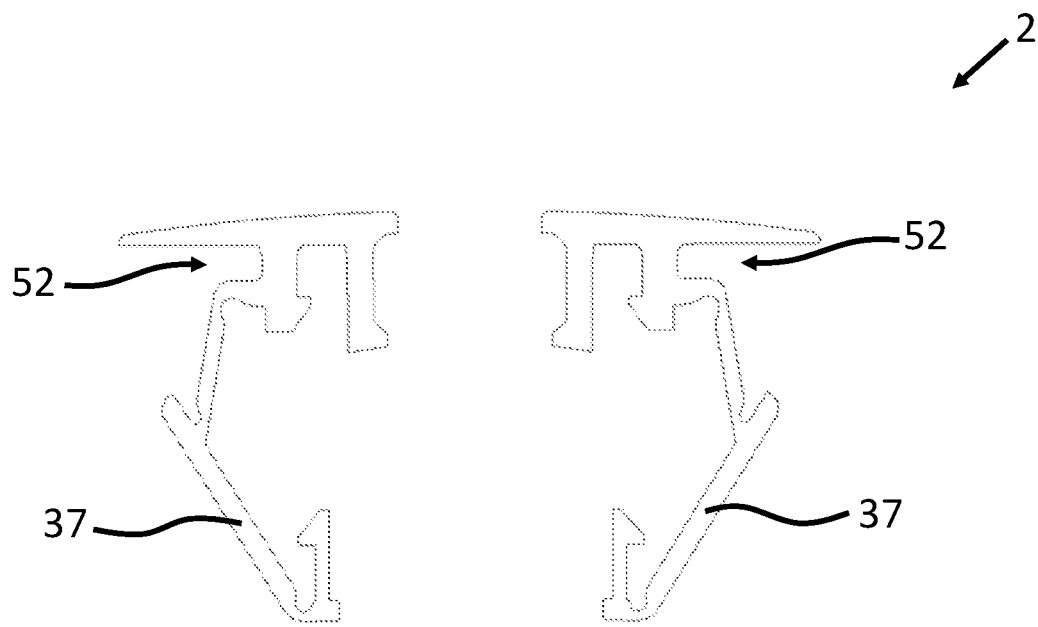
Figure 10:
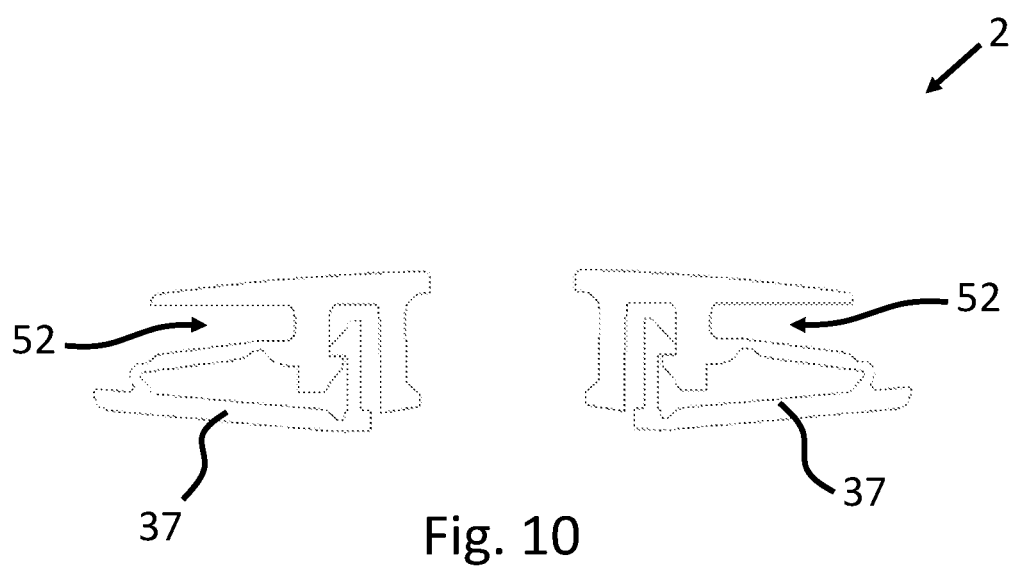

The fastening device 2 according to the invention is configured in order to be connected to a first component 52 to be attached to the second component 53, in particular a vehicle mat or a vehicle floor, in particular a floor mat of a motor vehicle (FIGS. 8 to 10).

The fastening device 2 comprises a cover wall 28, which has an approximately annular disk shape, with a visible side 29 and an assembly side 30 facing in the assembly direction 4.

A second through-opening 31 is formed in the cover wall 28.

Second catching elements 32 of a second catching device 33 are formed radially circumferentially about the second through-opening 31 on the assembly side 30, extending in the axial direction 6 or in the assembly direction 4.

The edge 25 of the assembly body 12 of the fastening apparatus 1 forms a catching edge 34 of the second catching device 33, via which the fastening apparatus 1 can be connected to the fastening device 2.

The assembly side 30 of the cover wall 28 is connected to an approximately annular receiving wall 36 via second retaining arms 35.

The fastening device 2 comprises four second retaining arms 35, which are arranged radially circumferentially and equally spaced-apart from one another. The second retaining arms 35 are connected in an articulated manner via hinges 38 to the assembly side 30 of the cover wall 28 as well as the receiving wall 36. These hinges 38 are preferably embodied as film hinges.

Alternatively, the fastening device 2 can also comprise two or three or five or more second retaining arms 35 (not shown).

In the region between the hinges 38, each retaining arm has a second articulated joint 39.

The regions of the second retaining arms 35 between the articulated joint and the assembly side 30 form second fastening portions 40.

A region of the second retaining arms 35 extending from the receiving wall 36 to the second articulated joints 39 is extended radially outward such that it respectively forms a second securing portion 41 with a second securing face 42 and a securing edge facing radially inwardly.

In the final assembly position 14, the securing face 42 is arranged approximately parallel to a surface of a first component 52. The edge of the securing face 42 facing in the direction of the articulated joint 39 forms a securing edge.

Third catching elements 43 of a third catching device 44 extending counter to the assembly direction 4 are integrally formed on the receiving wall 36.

In the region of the connection of the second retaining arms 35 to the assembly side 30 of the cover wall 28, correspondingly configured third counter-catching elements 45 of the third catching device 44 are formed in order to connect the cover wall 28 to the receiving wall 36 in the final assembly position 14.

Both the fastening apparatus 1 and the fastening device 2 taper in the axial direction 6 and the assembly direction 4, respectively, in order to insert the assembly element 8 and the receiving wall 36 into a through-opening of a second and a first component 52, respectively.

It is of critical importance here that the assembly element 8 has a smaller diameter than the base element 5 in the fastening apparatus 1. The same is true for the fastening device 2, in which the receiving wall 36 has a smaller diameter than the cover wall 28.

The assembly wall 9 of the assembly element 8 of the fastening device thus prevents slipping through a through-opening of a second component 53.

Likewise, the cover wall 28 prevents the fastening apparatus 1 from slipping through a through-opening of a first component 52.

Figure 11:
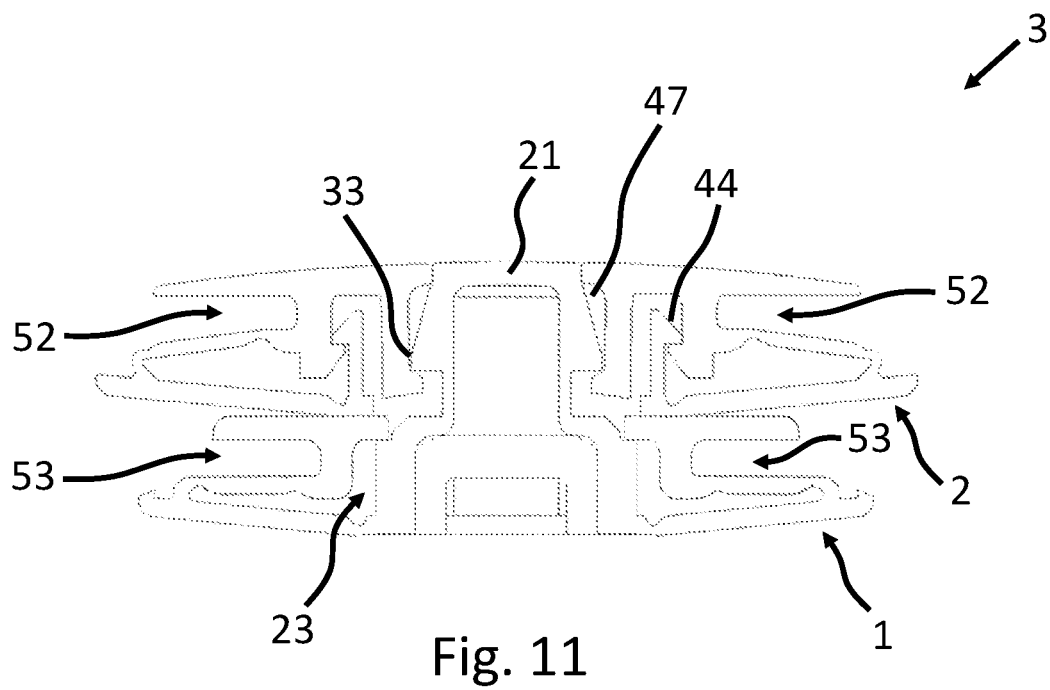

The fastening system 3 according to the invention thus comprises the fastening apparatus 1 and the fastening device 2 (FIG. 11).

In the following, a method for connecting the fastening apparatus 1 to a second component 53, in particular a vehicle floor 53 or a vehicle rug 53 and/or a carrier component 53 located behind it (FIGS. 5, 6, 7, and 11) is described.

It is intended here that the fastening apparatus is inserted into a through-opening of a second component 53 in a home position or in the pre-assembly position 13, with retaining arms 7 extending approximately in the assembly direction 4, in such a way that first the assembly element 8, which is located in front in the assembly direction 4, is guided through the through-opening of the second component 53 by applying a compressive force acting in the axial direction 6, such that the retaining arms 7 buckle in the region of the articulated joints 17 and clamp a peripheral region of the second component 53 that limits the through-opening.

In the event of a corresponding displacement of the assembly element 8 counter to the assembly direction 4, the catching elements 22 of the base element 5 engage with the catching recesses 24 of the assembly element 8 in such a way that the base element 5 and the assembly element 8 are fixed via the catching device 23 in the final assembly position 14.

In the following, a method according to the invention for connecting the fastening device 2 to a first component 52 is described. This is carried out substantially analogously to the method described using the fastening apparatus 1.

It is once again provided that the retaining arms extend into a home position or pre-assembly position 13 in approximately the axial direction 6 or the assembly direction 4. Here, too, the receiving wall 36 is first inserted into a through-opening of the first component 52.

By subjecting the cover wall to a compressive force acting in the assembly direction, the second retaining arms 35 buckle in the region of the second articulated joints 39, such that a corresponding edge region of the first component 52 that limits the through-opening of the first component 52 is retained between the assembly side 30 of the cover wall 28 and the second fastening portions 40.

The third catching elements 43 of the receiving wall 36 engage with the third counter-catching elements 45 of the cover wall 28 in such a way that the cover wall 28 and the receiving wall 36 are connected to one another via the third catching device 44.

The fastening apparatus 1 is now connected to a vehicle and the fastening apparatus 2 is connected to a floor mat 52.

A floor mat 52 is then arranged together with the fastening device 2 in the region of the fastening apparatus 1 of the vehicle floor 53 and again subjected to a compressive force acting in the axial direction or assembly direction.

The assembly body 12 of the fastening apparatus 1 slides through a third through-opening 46 of the receiving wall 36 such that the assembly body 12 of the fastening apparatus 1 is arranged in a receiving space 47 of the fastening device 2.

The fastening device can be connected to the second catching edge 34 or the edge 25 of the fastening body 12 via the second catching device 33 or the second catching elements 32.

LIST OF REFERENCE NUMERALS

1 Fastening apparatus
2 Fastening device
3 Fastening system
4 Assembly direction
5 Base element
6 Axial direction
7 Retaining arms
8 Assembly element
9 Assembly wall
10 Fastening wall
11 Through-opening
12 Assembly body
13 Pre-assembly position
14 Final assembly position
15 Base body
16 Joint/hinge
17 Articulated joint
18 Fastening portion
19 Securing portion
20 Securing face
21 Securing edge
22 Catching element
23 Catching device
24 Catching recess
25 Edge
26 Stop edge
27 Counter-stop edge
28 Cover wall
29 Visible side
30 Assembly side
31 Second through-opening
32 Second catching element
33 Second catching device
34 Second catching edge
35 Second retaining arms
36 Receiving wall
37 Arm portion
38 Hinge
39 Second articulated joint
40 Second fastening portion
41 Second securing portion
42 Second securing face
43 Third catching element
44 Third catching device
45 Third counter-catching element 46 Third through-opening
47 Receiving space
48 Bottom wall
49 Abutting portion
50 Abutting rib
51 Counter-catching element

The invention claimed is:

1. A fastening apparatus for fastening a first component to a second component, comprising:
   an annular base element having an assembly wall for abutting against the first component and a first fastening wall opposite the assembly wall for abutting against the second component,
   an assembly element having a bottom wall,
   wherein, in order to be passed through a through-opening of the second component in an assembly direction, the assembly element has a smaller diameter than the base element, and
   at least two diametrically-opposed, foldable retaining arms, which connect the assembly wall of the annular base element to the assembly element, wherein the diametrically-opposed, foldable retaining arms are each connected to the assembly element and the annular base element via a respective joint and form an articulated joint in the region between the joints, wherein a region of each of the diametrically-opposed, foldable retaining arms between the articulated joints and the assembly wall forms a fastening portion, and wherein at least one catching device is provided in order to connect the annular base element to the assembly element in an assembly position, such that the second component is retained between the first fastening wall and the fastening portions, such that the fastening apparatus is connectable to the second component, and an assembly body for connecting to the first component, which extends counter to an assembly direction, wherein means are provided on the assembly body for connecting to a correspondingly configured means of the first component.

2. The fastening apparatus according to claim 1,
   wherein the assembly body is arranged on the bottom wall of the assembly element and extends towards the annular base element, wherein the annular base element comprises a base through-opening for passage of the assembly body.

3. The fastening apparatus according to claim 1,
   wherein the assembly body is integrally formed on the assembly wall of the annular base element.

4. The fastening apparatus according claim 1,
   wherein a region of the diametrically-opposed, foldable retaining arms between the articulated joint and the assembly element is extended in the radial direction beyond the articulated joint in the region of the articulated joint, wherein said extension forms a securing portion, and wherein the securing portion forms a securing face, which is arranged in an assembly position approximately parallel to a surface of the second component, and wherein an edge of the securing face facing in the direction of the articulated joint forms a securing edge.

5. The fastening apparatus according to claim 1
   wherein the catching device comprises arms that extend approximately in the assembly direction and are integrally formed on the first fastening wall of the annular base element, wherein correspondingly configured counter-catching means, in particular catching recesses, are arranged on the assembly element, and wherein at least two diametrically opposed catching arms are provided, which are arranged radially circumferentially and equally spaced apart from one another.

6. The fastening apparatus according to claim 1,
   wherein a stop edge is formed on the annular base element, against which edge the first fastening wall can abut with a counter-stop edge in a final assembly position when the fastening apparatus is subjected to a force acting counter to the assembly direction.

7. A method for connecting a fastening apparatus according to claim 1 with the second component, comprising the following steps:
   inserting the assembly element into the through-opening of the second component in the assembly direction until the first fastening wall of the annular base element abuts against the surface of the second component, wherein, upon insertion in the assembly direction, the second component is clamped by the diametrically-opposed, foldable retaining arms in a region between the first fastening wall and the fastening portions, and
   connecting the assembly element to the annular base element by means of the catching device.

8. A fastening system, comprising:
   a fastening apparatus according to claim 1,
   a fastening device for connecting to the first component, comprising:
      a circular disk-shaped cover wall having a visible side and an assembly side and a cover through-opening, and connecting means are configured in the region of the cover through-opening and correspond to the assembly body of the fastening apparatus.

9. The fastening system according to claim 8,
   wherein the fastening device comprises at least two diametrically-opposed, foldable second retaining arms, wherein second fastening portions of each of the diametrically-opposed, foldable second retaining arms extend radially outward and are connected to the assembly side via a respective second joint, wherein the second fastening portions are connected to catching portions and second catching devices via an articulated joint in order to connect the diametrically-opposed, foldable second retaining arms to the assembly side in an assembly position, such that the first component is retained between the second fastening portions and the assembly side, such that the fastening device is connected to the first component.

10. A method for fastening a first component to a second component, utilizing the fastening system of claim 9, comprising the following steps:
    inserting the assembly element into the through-opening of the second component in the assembly direction until the first fastening wall of the annular base element abuts against the surface of the second component, wherein, upon insertion in the assembly direction, the second component is clamped by the diametrically-opposed, foldable retaining arms in a region between the first fastening wall and the fastening portions;
    connecting the assembly element to the annular base element by the catching device;
    inserting the fastening device into a through-opening of the first component in an assembly direction until the assembly side of the cover wall abuts against the surface of the first component, wherein, upon insertion in an assembly direction, the first component is clamped by the diametrically-opposed, foldable second retaining arms in a region between the assembly side and second assembly portions, and connecting the fastening device via connecting means to the assembly element of the fastening apparatus.

* * * * *